(12) United States Patent
Chappell

(10) Patent No.: US 10,779,548 B1
(45) Date of Patent: Sep. 22, 2020

(54) HANDHELD MEAT SKINNER WITH PINNED HYBRID TOOTH ROLL

(71) Applicant: Hall Fabrication, Inc., Las Vegas, NV (US)

(72) Inventor: Dave Chappell, Las Vegas, NV (US)

(73) Assignee: Hall Fabrication, Inc., Las Vegas, NV (US)

( * ) Notice: Subject to any disclaimer, the term of this patent is extended or adjusted under 35 U.S.C. 154(b) by 0 days.

(21) Appl. No.: 16/299,532

(22) Filed: Mar. 12, 2019

(51) Int. Cl.
*A22B 5/00* (2006.01)
*A22B 5/16* (2006.01)
*B26D 3/28* (2006.01)
*A22C 17/12* (2006.01)
*B26D 7/26* (2006.01)

(52) U.S. Cl.
CPC .............. *A22B 5/166* (2013.01); *A22B 5/168* (2013.01); *A22C 17/12* (2013.01); *B26D 3/283* (2013.01); *B26D 7/2621* (2013.01); *B26D 2210/02* (2013.01)

(58) Field of Classification Search
CPC ........... A22B 5/166; A22B 5/168; A22B 5/16; A22B 5/163; A22C 25/17; A22C 25/006
USPC ................ 452/125, 127, 129, 130, 132, 133
See application file for complete search history.

(56) References Cited

U.S. PATENT DOCUMENTS

| | | | | |
|---|---|---|---|---|
| 3,733,997 A | * | 5/1973 | Beasley | A22C 17/12 452/127 |
| 4,071,923 A | | 2/1978 | Smith | |
| 4,186,461 A | * | 2/1980 | Leining | A22B 5/168 452/133 |
| 4,451,953 A | * | 6/1984 | Leining | A22B 5/166 452/130 |
| 4,628,806 A | * | 12/1986 | Murphy | A22C 17/12 452/127 |
| 4,631,780 A | | 12/1986 | Leining | |
| 5,813,904 A | * | 9/1998 | Aslanis | A22C 25/17 452/101 |
| 5,997,394 A | | 12/1999 | Loseke | |
| 9,480,263 B2 | * | 11/2016 | Van Der Leest | A22B 5/166 |
| 9,516,887 B1 | * | 12/2016 | Ewers | A22B 5/166 |

* cited by examiner

*Primary Examiner* — Richard T Price, Jr.
(74) *Attorney, Agent, or Firm* — McKee, Voorhees & Sease, PLC

(57) ABSTRACT

A handheld teeth skinning tool is provided with a head assembly having at toothed roller with interchangeable teeth rings, with the rings having different tooth configurations. The teeth rings are securely mounted on the insert arbor using male and female connections. The teeth rings may include pointed teeth for aggressively gripping the skin for direction into the blade of the head assembly, while square teeth allow for easy manual maneuverability of the head assembly on the meat carcass or head. The roller provides increase life expectancy and improved handling for lower costs and higher productivity.

21 Claims, 9 Drawing Sheets

HANDHELD MEAT SKINNER WITH PINNED HYBRID TOOTH ROLL

FIELD OF THE INVENTION

The invention relates to the meat processing industry, and particularly to a handheld skinner to manually remove skin, hair, and fat from meat. The skinner has improved tooth rolls with a hybrid tooth configuration, and which are fixed on the arbor or insert by pins, keys, or splines.

BACKGROUND OF THE INVENTION

Handheld, powered meat skinners have been used for decades in the meat packing industry to remove skin, hair and fat from the carcass and head. One example of a prior art skinner device is disclosed in U.S. Pat. No. 4,631,780. These prior art skinner devices include a roller with teeth to grip the skin as an operator manually moves the device so that a blade separates the skin from the meat. The roller is driven with worm gears.

A typical packing plant will skin thousands of hogs by each operator during their work shift. Regulations require that the skinner be sanitized after each hog so as to avoid cross contamination. The operator will dip the head of the skinning device in to a scald tank having water at least 180° F. The conventional roller is constructed of a plastic insert or arbor, with metal tooth rings thereon. The repetitious sanitation process causes the plastic arbor to expand and contract. Eventually, the tooth rings loosen on the arbor, and may be come misaligned. The normal life expectancy for the conventional roller is approximately one week, after which the plastic insert is removed and replaced, with the metal teeth rings re-installed on a new plastic arbor. Also, since teeth rings are manually pressed onto the arbor, there is human error which leads to misalignment of the teeth on each end of arbor. Misalignment of the teeth rings causes excessive side loading on the roller, and there by decreases life of the roller.

These problems of short roller life and teeth misalignment have been present in the industry for at least 30 years. Satisfactory solutions have not been developed, such that there is long felt need for an improved roller for these handheld skinners.

Accordingly, a primary objective of the present invention is the provision of an improved roller having an extended life expectancy for use in handheld meat skinners.

Another objective of the present invention is the provision of a skinning tool for skinning meat carcasses and having a hybrid tooth roller with multiple teeth configurations.

A further objective of the present invention is the provision of a hand tool for skinning an animal carcass or head, wherein the teeth rings are mounted on the insert arbor using a male and female connection, thereby eliminating a friction fit connection.

Still another objective of the present invention is the provision of the improved power tool for removing skin from animal carcass and heads having a tooth roller with different teeth rings having different teeth designs.

Another objective of the present invention is the provision of a handheld meat skinner having improved maneuverability to allow the operator to complete the skinning process with less passes so as to save time and improve productivity.

Still another objective of the present invention is the provision of a meat skinning tool that is economical to manufacture, and safe and durable in use.

These and other objectives will become apparent from the following description of the invention.

SUMMARY OF THE INVENTION

The handheld, powered skinning tool includes a body with a handle, a skinning blade on the body, and a toothed roll with multiple teeth designs mounted on the body. The teeth rings are mounted on the plastic insert or arbor using pins, keys, or splines, to prevent rotation of the rings relative to the arbor. This connection increases the life of the roller, while the hybrid teeth allow for improved maneuverability for decreased skinning time and increased productivity.

DETAILED DESCRIPTION OF THE PREFERRED EMBODIMENTS

Figure 1:
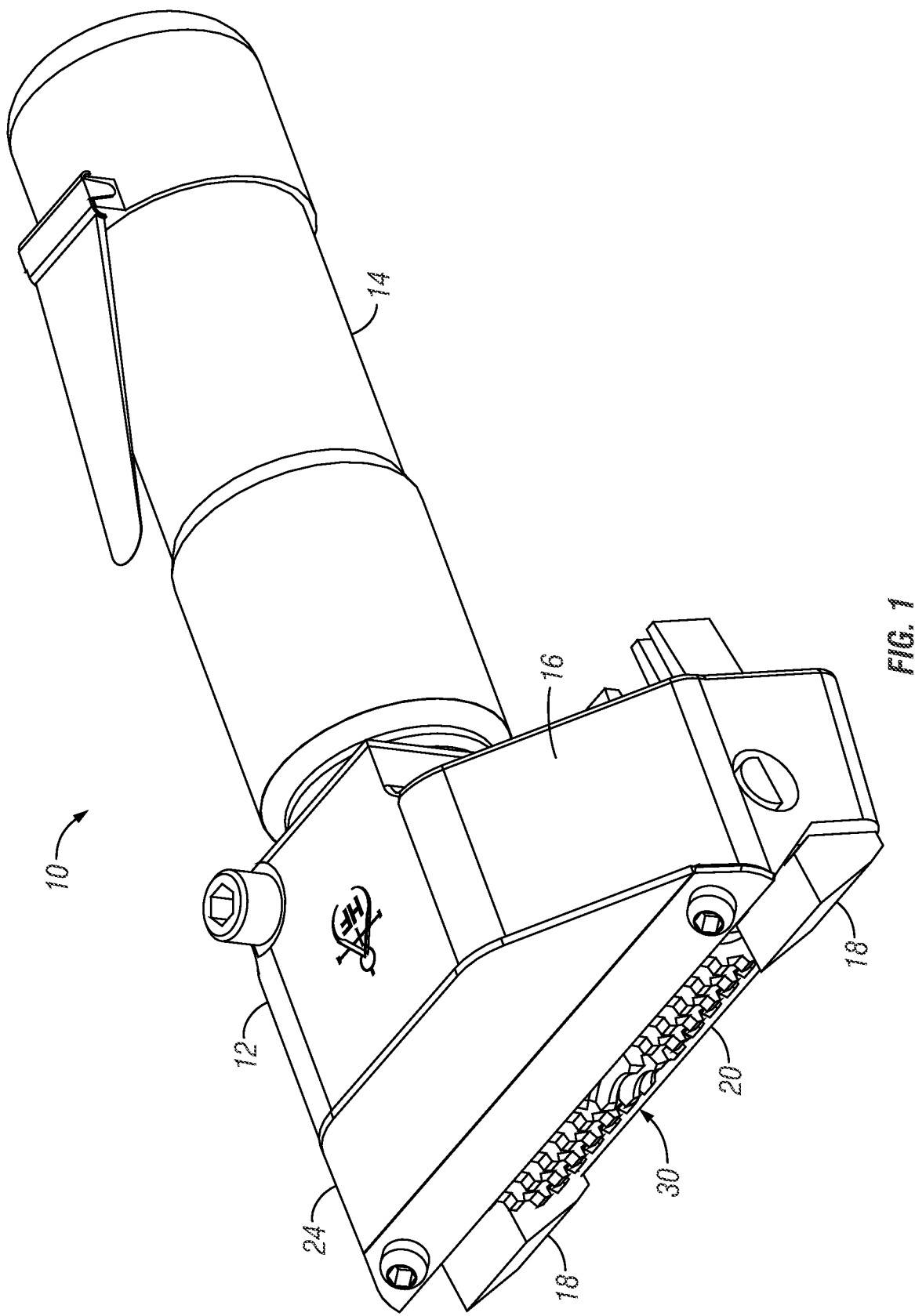
FIG. 1 is a perspective view of the handheld skinning tool according to the present invention.

A handheld, powered meat skinner tool or device 10, includes a head assembly 12 with a handle 14. The head assembly 12 includes a body 16, with left and the right shoes 18, with a skinner blade 20, a stripper 22, and front guard plate or cover 24. The head assembly 12 also drivingly supports a worm gear 26, which is powered by an air motor (not shown) or other power source.

The above components of the skinner 10 are conventional, and do not constitute part of the present convention.

The invention is directed toward an improved toothed roller 30 for the skinner 10. The roller 30 is mounted to the body 16 using a shaft 32. The ends of the shaft 32 are supported by the opposite sides of the body 16, as is the known in the art.

Figure 2:
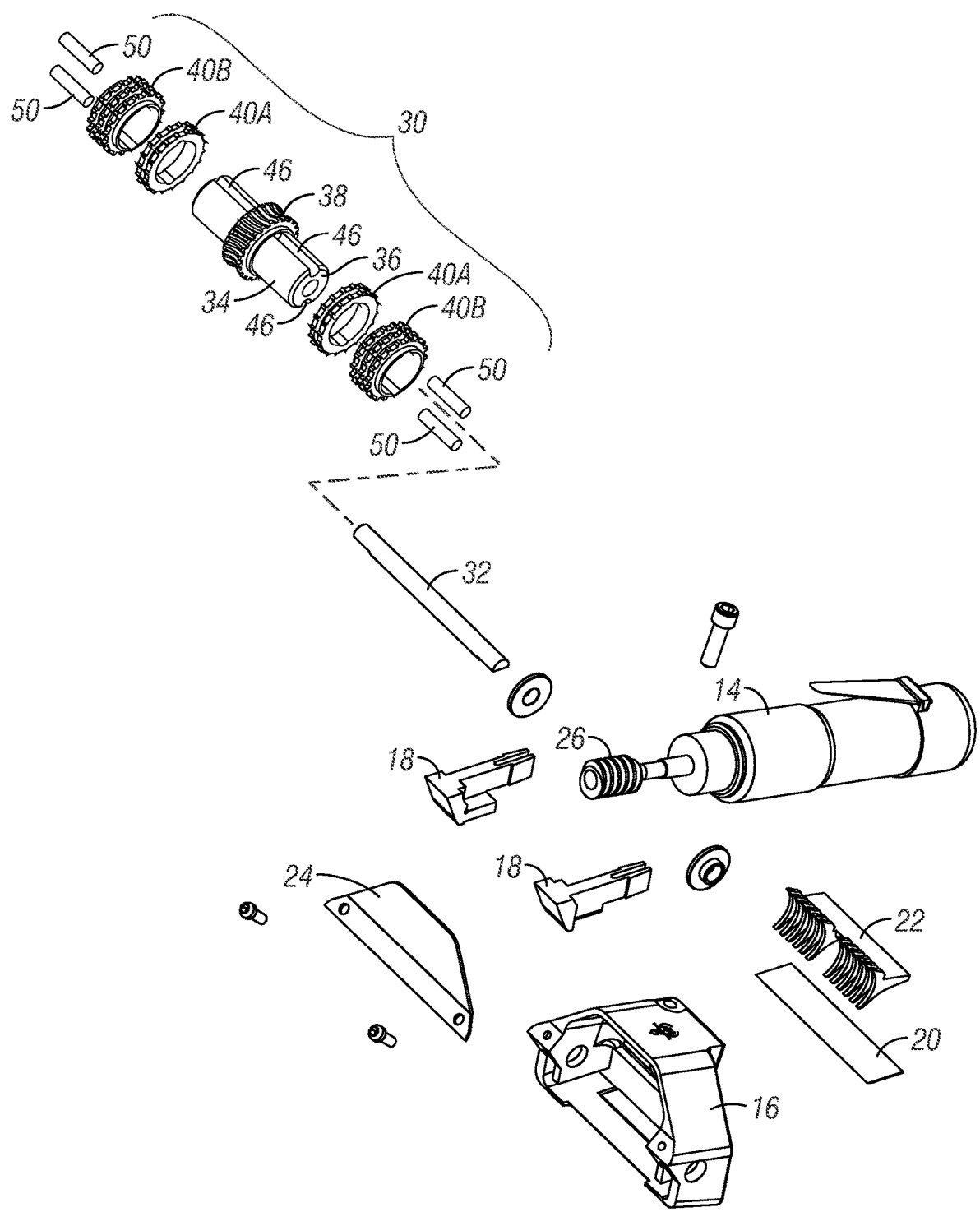
FIG. 2 is an exploded view of the skinning tool.
Figure 7:
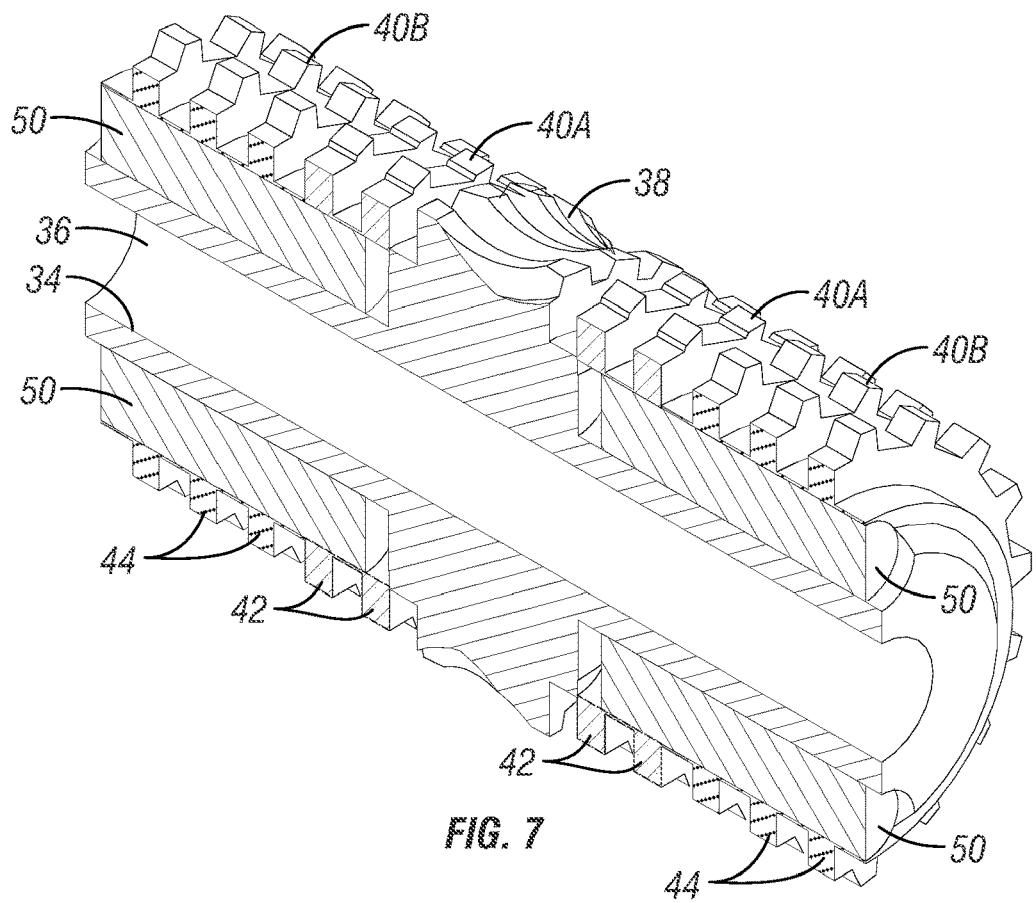
FIG. 7 is a sectional view of the tooth roll along line 7-7 of FIG. 5.
Figure 8:
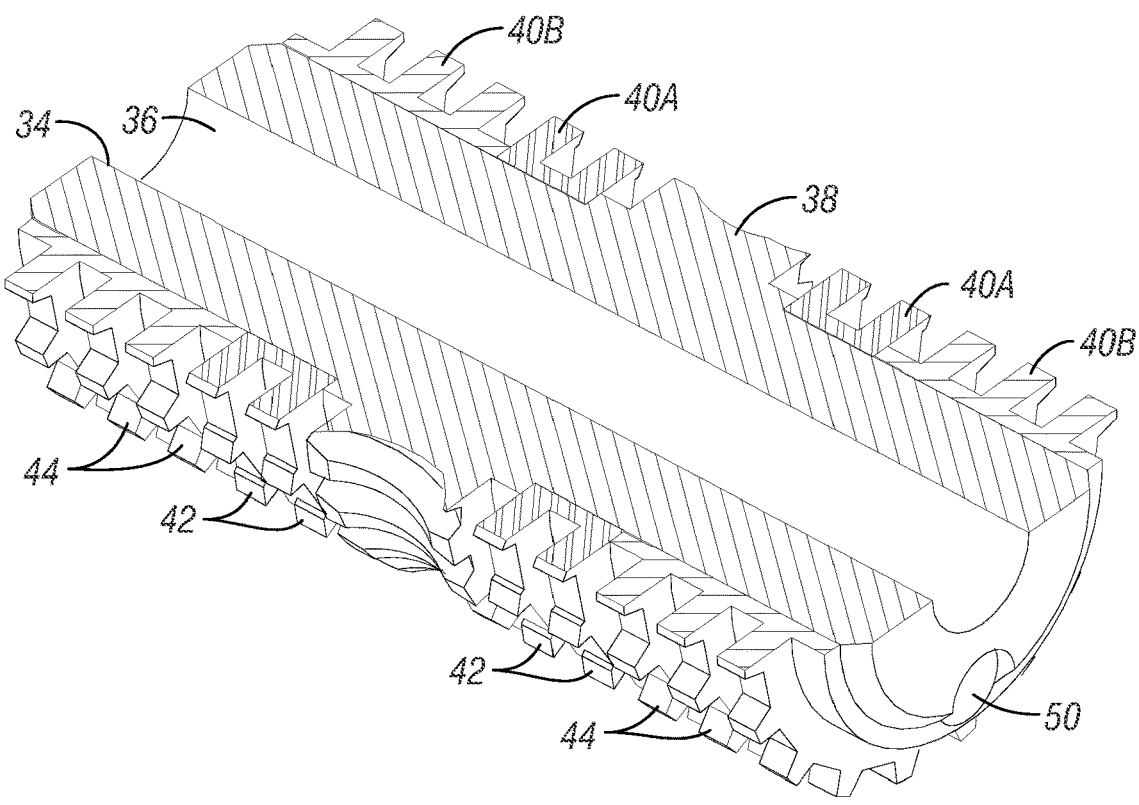
FIG. 8 is another sectional view of the tooth roll taken along line 8-8 of FIG. 5.

The roller 30 includes a plastic insert or arbor shaft 34 having a longitudinal bore 36 for receiving the mounting shaft pin 32. The arbor 34 includes a gear 38 for meshing engagement with the worm gear 26. In a preferred embodiment, the arbor 34 and the gear 38 are plastic molded as one piece, as seen in FIG. 7. Teeth rings 40 are mounted on the arbor 34 for rotation therewith. The teeth rings 40 are mounted on the insert arbor 34 on opposite sides of the gear 38, as seen in FIGS. 2 and 3.

Figure 3:
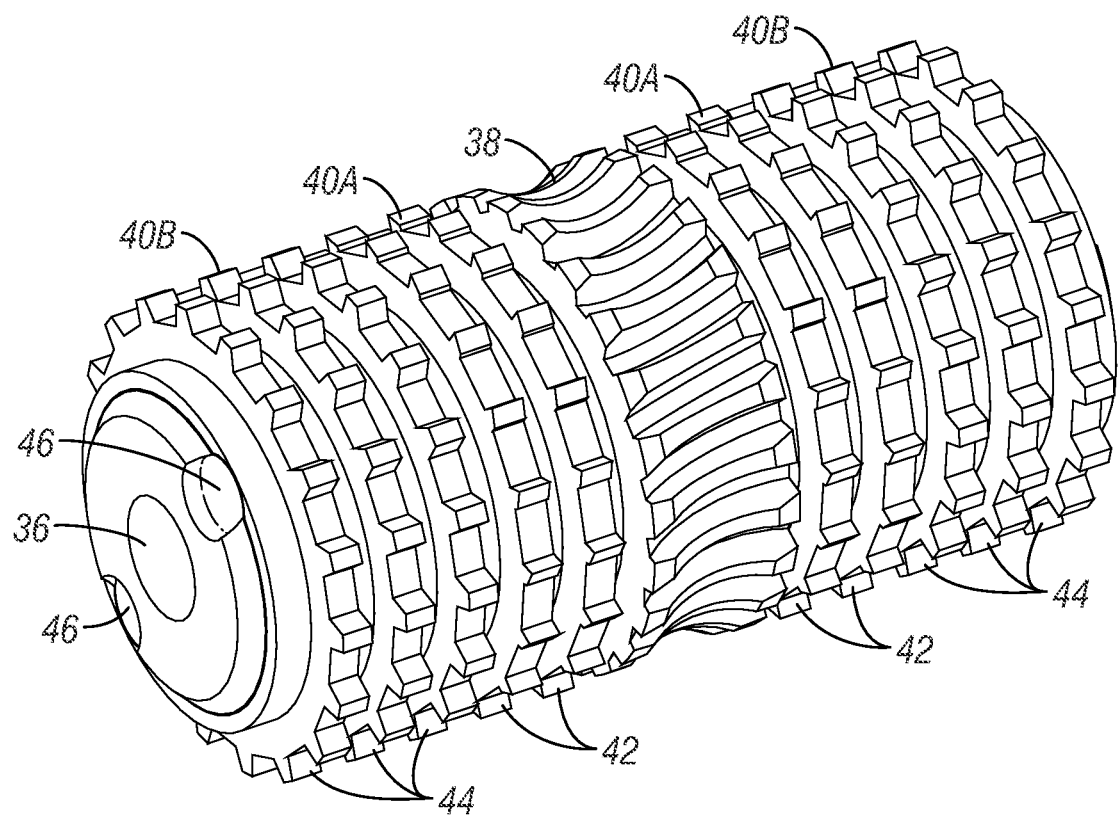
FIG. 3 is a perspective view of the hybrid tooth roll of the skinning tool.
Figure 4:
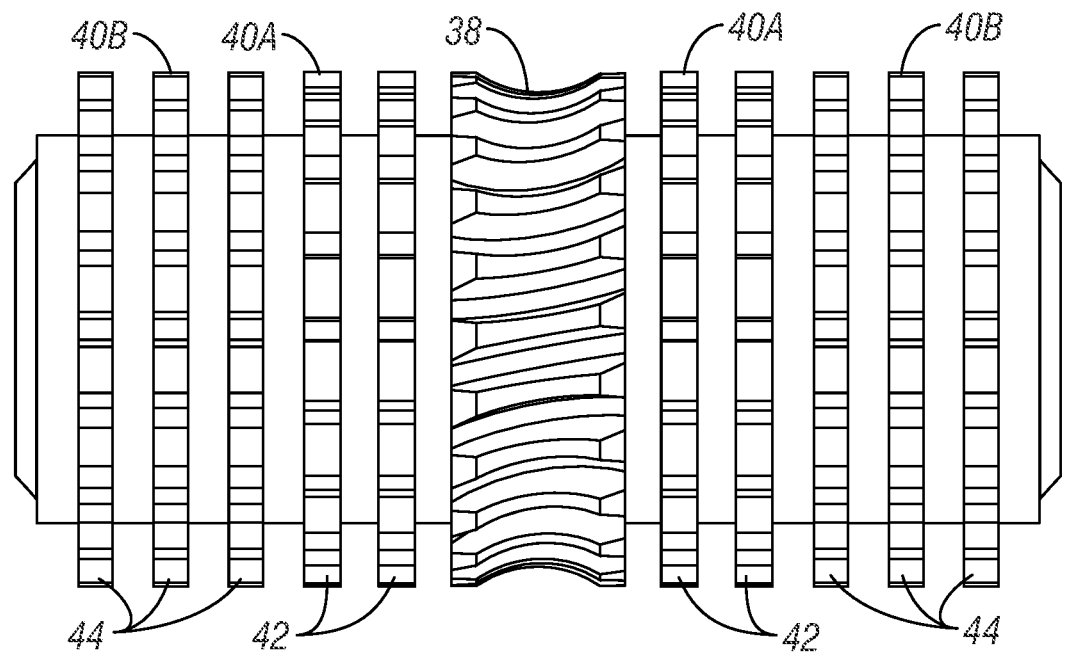
FIG. 4 is a side elevation view of the hybrid tooth roll.
Figure 5:
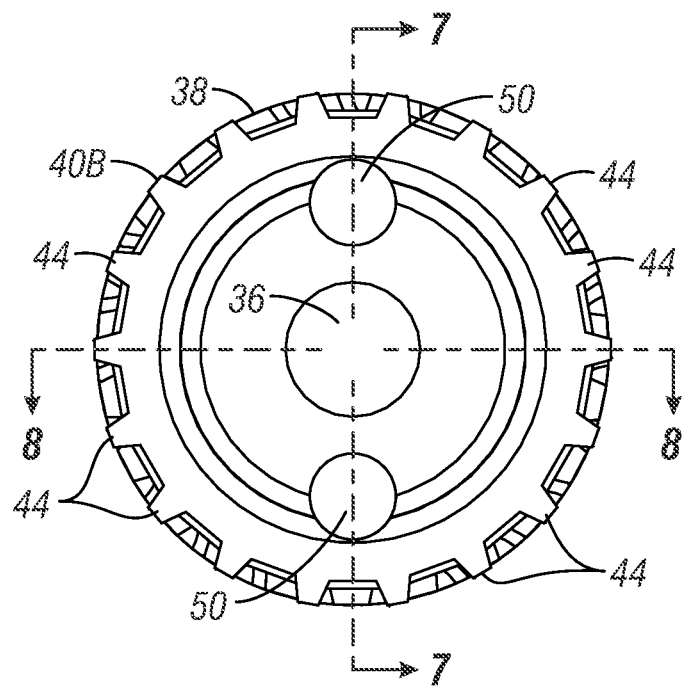
FIG. 5 is an elevation view of the hybrid tooth roll.
Figure 6:
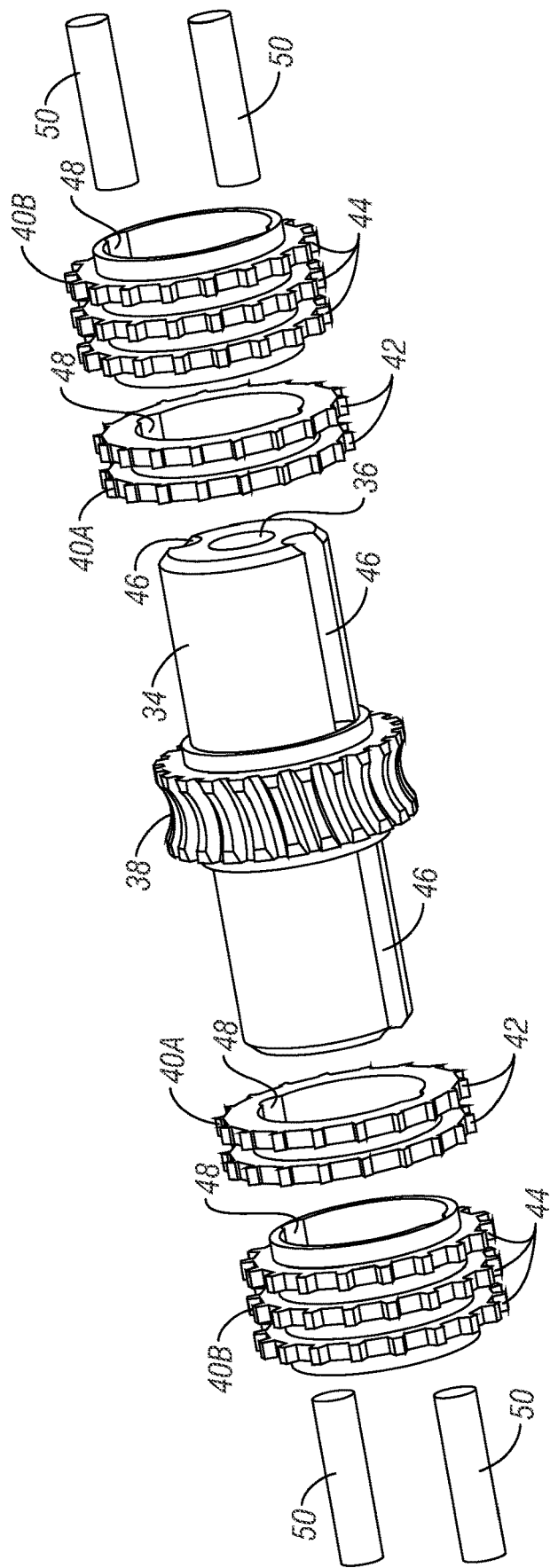
FIG. 6 is an exploded perspective view of the hybrid tooth roll.
Figure 9:
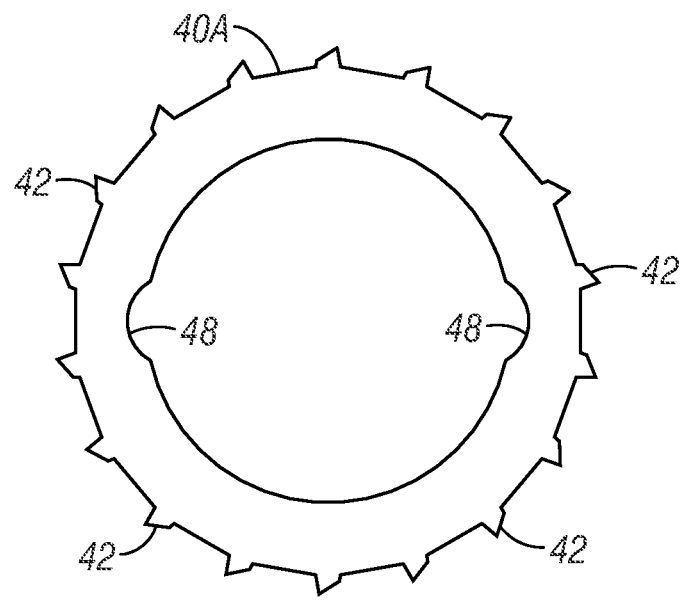
FIG. 9 is an end view of a first teeth ring with pointed teeth, according to the present invention.
Figure 10:
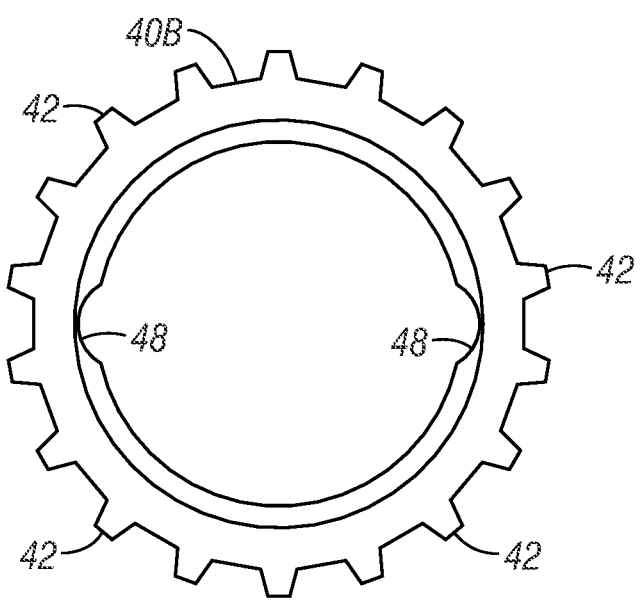
FIG. 10 is an end view of a second teeth ring with square teeth, according to the present invention.

In the preferred embodiment, shown in FIG. 3, there are multiple sets or pairs of teeth rings, with different sets having different teeth designs or configurations. As seen in FIG. 9, one design is for a ring 40A having pointed teeth 42. As shown in FIG. 10, another design is a ring 40B having square teeth 44. As shown in FIG. 6, the rings 40A are mounted adjacent to the gear 38, and the rings 40B are mounted laterally outside the rings 40A. It is understood that this orientation of the rings 40A, 40B can be reversed, if desired.

The pointed teeth 42 are more aggressive and grip the skin more firmly, compared to the square teeth 44. The square teeth 44, which engage but don't penetrate the skin, allow the operator to maneuver the skinner 10 in tighter or narrower paths along the carcass or head being skinned. For example, as the skinner 10 approaches the end of the carcass, the operator can maneuver the skinner to make a faster 180° turn and continue skinning in the opposite direction. This improved maneuverability minimizes the number of passes required to complete the skinning operation, thereby saving time and increasing productivity.

The rings 40A, 40B are not press or friction fit onto the insert arbor 34, as in the prior art, but rather are fixed on the arbor 34 using a mechanical connection. For example, the arbor 34 includes slots 46, and the rings 40A, 40B includes slots 48. Pins 50 are inserted into the aligned slots 46, 48 so as to prevent rotation of the rings relative to the arbor. While the slots 46, 48 are shown to be curved, and the pins 50 are shown to be round, it is understood that the slots can have a square profile, with a square key used in place of the pins 50.

An alternative connection for mounting the rings on the arbor 34 includes splines 52 (FIGS. 11 & 12) which are received in the slots 48 of the rings 40A, 40B. As a further alternative, the splines and slot can be reversed, with the splines (not shown) extending inwardly from the inner circumference of the rings 40 for receipt in the slots 46 on the arbor 34.

The male pins 50, keys, or splines 52 and the female slots 46, 48 overcome the prior art problem of teeth misalignment, both at the initial assembly of the rings 40 on the arbor 34 and after repeated sanitation sequences. By maintaining proper alignment of the teeth of the rings 40A, 40B, excess side loading is eliminated, thereby increasing life of the roller 30. For example, in tests of the improved roller 30, the life expectancy was increased four times, as compared to current and conventional prior art rollers on skinning tools. Such an extended life of the roller 30 provides significant cost savings, both in terms of the replacement cost of new arbors, and the labor cost for the assembly time.

Figure 11:
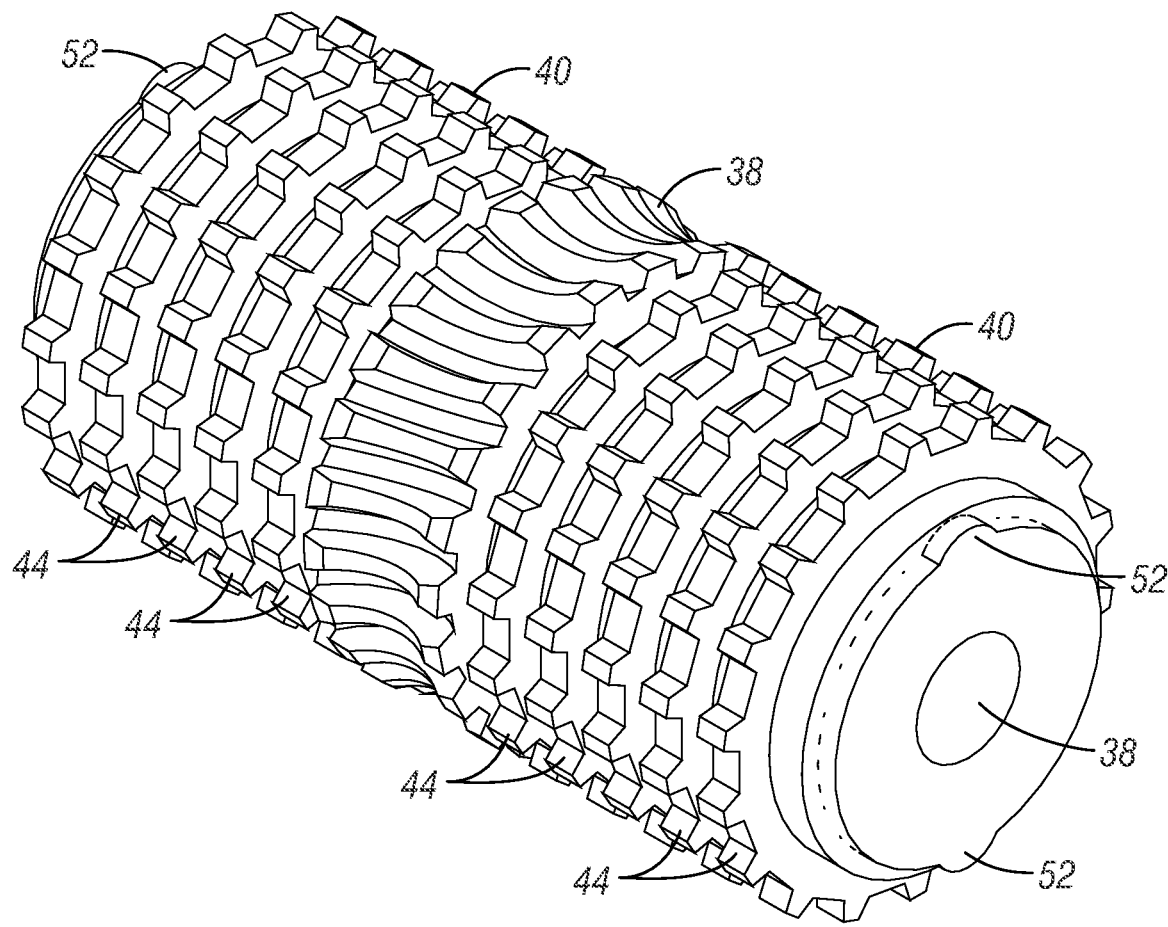
FIG. 11 is a perspective view of an alternative embodiment of a non-hybrid roller, according to the present invention.
Figure 12:
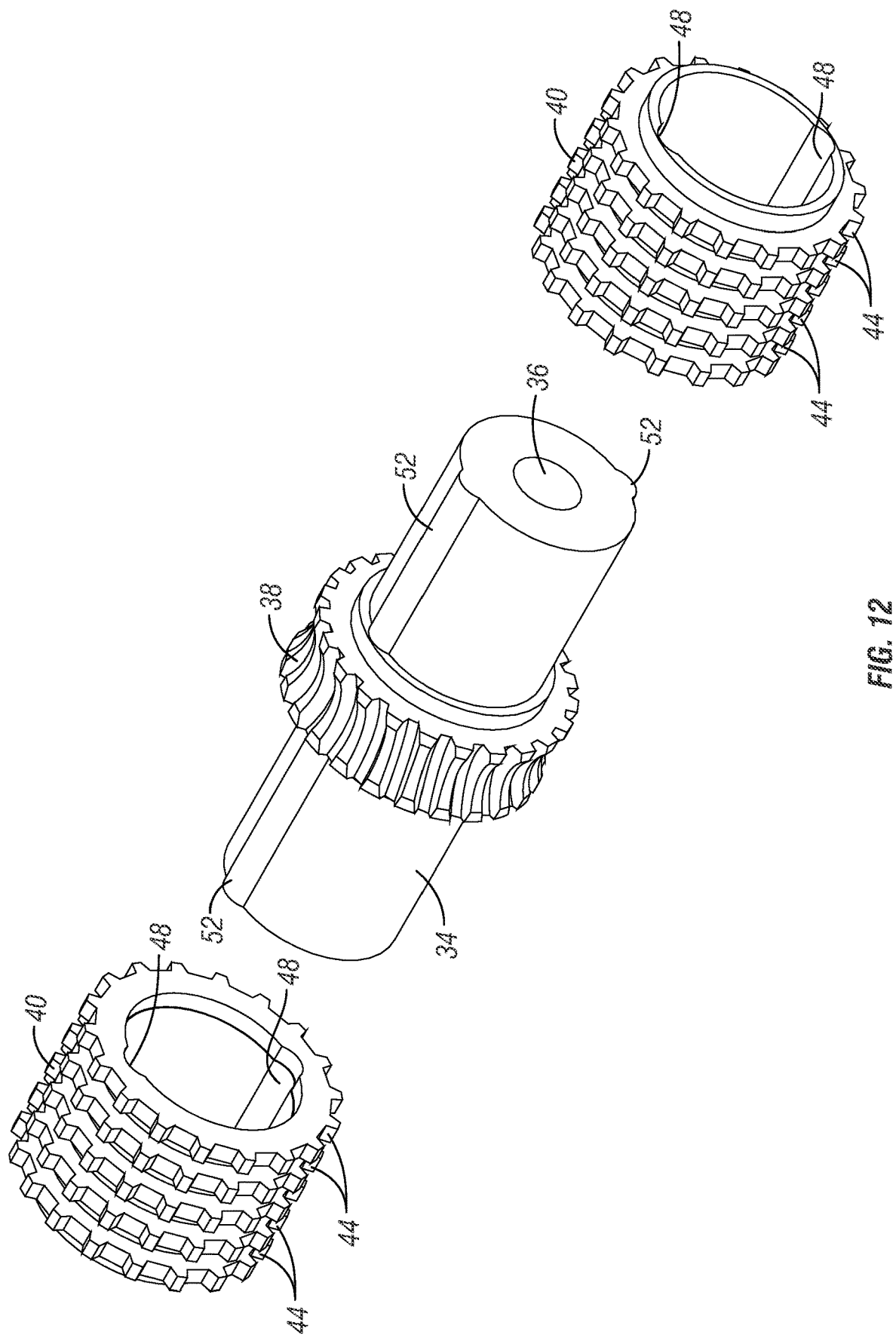
FIG. 12 is a perspective view of the roller of FIG. 11.

It is understood that the teeth rings 40A, 40B can be used together for a hybrid roller 30, as seen in FIG. 1-8, or alternatively only one tooth design can be used on the arbor 34, as seen in FIGS. 11 & 12. Other tooth designs, beyond those shown in the drawings, can also utilized alone or in combination for the present invention. Thus, the invention provides multiple combinations of interchangeable teeth rings on the arbor 34, depending on the task at hand. The tooth roller 30 also allows quick and easy exchange of the teeth rings 40, due to the minimal friction between the rings 40 and the arbor 34, and without risk of misalignment during assembly or use.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A skinning tool for skinning meat, comprising:
   a body;
   a handle on one end of the body;
   a skinny blade on the body;
   a toothed roller having opposite ends, and with multiple teeth designs rotatably mounted on the body; and
   the teeth designs including square teeth at the ends of the roller and pointed teeth at the center of the roller.

2. The skinning tool of claim 1 wherein the roller includes interchangeable rings, with at least one ring having a different tooth design than another ring.

3. The skinning tool of claim 1 wherein the roller includes an arbor and a plurality of teeth rings removably mounted on the arbor.

4. The skinning tool of claim 3 wherein the teeth rings are pinned to the arbor.

5. The skinning tool of claim 3 wherein the teeth rings and the arbor have aligned slots, with a pin in the slots to prevent rotation of the rings on the arbor.

6. The skinning tool of claim 1 wherein the teeth designs include pointed teeth and square teeth.

7. A hand tool for skinning an animal carcass, comprising:
   a head assembly with a drive gear and a skinning blade, and a roller driven by the gear, the roller comprising:
      an arbor with a central driven gear in mesh with the drive gear and a longitudinal slot on each end of the arbor;
      a first pair of toothed rings mounted on the arbor on opposite sides of the driven gear;
      the rings each having slots aligned with the slots on the arbor; and
   a male and female connection between the rings and the arbor to prevent rotation of the rings on the arbor.

8. The hand tool of claim 7 wherein the connection includes male pins and female slots.

9. The hand tool of claim 8 further comprising a second pair of toothed rings mounted on the arbor on opposite sides of the driven gear and having slots to receive the pins so as to fix the second rings against rotation on the arbor.

10. The hand tool of claim 9 wherein the teeth on the first pair of rings have a different configuration than the teeth on the second pair of rings.

11. The hand tool of claim 9 wherein the first pair of rings have square teeth and the second pair of rings have pointed teeth.

12. The hand tool of claim 9 wherein the first and second pairs of rings are interchangeable on the arbor.

13. An improved power tool for removing skin from meat, the tool including a handheld head assembly with a skinning blade and a rotatable roller for gripping the skin and directing the skin toward the blade, the improvement comprising:
   a plurality of teeth rings removably mounted on a shaft of the roller, with different ones of the rings having different teeth configurations; and
   the teeth configurations including more aggressive teeth along a first portion of the roller and less aggressive teeth along a second portion of the roller.

14. The tool of claim 13 further comprising a lock connection between the rings and the shaft to prevent rotation of the rings on the shaft.

15. The improved power tool of claim 14 wherein the lock connection extends parallel to a rotational axis of the shaft.

16. The improved power tool of claim 14 wherein the lock connection includes pins in slots in the rings and in the shaft.

17. The improved power tool of claim 13 wherein the teeth include square and pointed configurations.

18. The improved power tool of claim 17 wherein the square teeth reside adjacent opposite ends of the shaft and the pointed teeth reside adjacent a central portion of the shaft.

19. The improved power tool of claim 13 wherein the more aggressive teeth have sharp tips and the less aggressive teeth have flat tips.

20. The improved power tool of claim 13 wherein the first portion of the roller extends along a middle of the roller and the second portion of the roller extends along at least one end of the roller.

21. The improved tool of claim 13 wherein the less aggressive teeth reside at opposite ends of the roller and the more aggressive teeth reside between the less aggressive teeth.

* * * * *